United States Patent
Price, Jr.

(10) Patent No.: US 6,721,115 B2
(45) Date of Patent: Apr. 13, 2004

(54) SYSTEM AND METHOD FOR ENHANCING WRITE DRIVER PERFORMANCE

(75) Inventor: John J. Price, Jr., Edina, MN (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/118,782

(22) Filed: Apr. 9, 2002

(65) Prior Publication Data

US 2003/0189447 A1 Oct. 9, 2003

(51) Int. Cl.[7] ............................. G11B 5/09; G11B 5/02
(52) U.S. Cl. .................... 360/46; 360/68; 360/67; 327/110; 327/108
(58) Field of Search .................. 360/46, 67, 68, 360/61, 66, 45; 327/108, 110, 310, 328

(56) References Cited

U.S. PATENT DOCUMENTS

| | | | | |
|---|---|---|---|---|
| 5,291,347 A | * | 3/1994 | Ngo et al. ..................... | 360/68 |
| 5,296,975 A | * | 3/1994 | Contreras et al. .............. | 360/46 |
| 5,757,215 A | * | 5/1998 | Schuelke et al. ........... | 327/110 |
| 5,894,237 A | * | 4/1999 | Brannon et al. ............. | 327/110 |
| 6,133,768 A | * | 10/2000 | Price et al. .................. | 327/110 |
| 2002/0027456 A1 | * | 3/2002 | Barrow ........................ | 327/110 |
| 2003/0067700 A1 | * | 4/2003 | Barnett et al. ................ | 360/46 |

* cited by examiner

*Primary Examiner*—David Hudspeth
*Assistant Examiner*—Natalia Figueroa
(74) *Attorney, Agent, or Firm*—W. Daniel Swayze, Jr.; W. James Brady; Frederick J. Telecky, Jr.

(57) ABSTRACT

A technique for presenting an optimally timed control signal to an upper H-switch driver in a fashion capable of achieving a very fast transition of the current in the inductive recording head. The technique also provides a current boost during the transition while resulting in minimized power consumption at other times.

6 Claims, 3 Drawing Sheets

SYSTEM AND METHOD FOR ENHANCING WRITE DRIVER PERFORMANCE

BACKGROUND OF THE INVENTION

1. Field of the Invention

This invention relates generally to write drivers, and more particularly, to a technique for enhancing the performance of inductive recording head write drivers.

2. Description of the Prior Art

H-switch drivers are used in magnetic disk drives to supply write current to the inductive recording head to write data to recording disks. An H-switch generally includes four transistor switches, each forming one leg of the H. A write head coil is then connected to terminals across the center span of the H. Current is passed through the coil in a first direction by operating two of the transistor switches in opposite legs of the H-switch. Similarly, current is passed through the coil in the opposite direction by operating the remaining two transistor switches.

Write drivers for inductive write heads require a stout pull-up at the upper H-switch to achieve fast switching. Generally, a low-valued resistor is used in the pre-driver to accomplish the desired pull-up, which results in considerable power dissipation. U.S. Pat. No. 6,184,727, entitled *Write Driver Circuit Having Enhanced Switching Control Circuitry*, issued Feb. 6, 2001 to Price, Jr., describes use of control signals to achieve fast switching; but this technique does not provide the optimal control signal timing necessary to achieve fast switching.

In view of the foregoing, it would be desirable and advantageous to provide a technique for presenting an optimally timed control signal to an upper H-switch driver in a fashion capable of achieving a very fast transition of the current in the inductive recording head. It would also be desirable and advantageous if the technique could provide a current boost during the transition while resulting in minimized power consumption at other times.

SUMMARY OF THE INVENTION

The present invention is directed to a system and method for enhancing the performance of inductive recording head write drivers.

In one aspect of the invention, a system and method provides an optimally timed control signal to an upper H-switch driver to achieve a very fast transition of the current in the inductive recording head.

In another aspect of the invention, a system and method provides an inductive recording head current boost during the transition of the current in the inductive recording head, while resulting in minimized power consumption at other times.

One embodiment of the invention is directed to a write current driver circuit comprising an H-switch driver having first and second upper switches and further having first and second lower switches, wherein the H-switch driver is operational to direct write current in opposite directions through a write head connected between a first node connecting the first upper switch to the first lower switch and a second node connecting the second upper switch to the second lower switch in response to first and second input signals; a first current pulse generator; and a first inverter circuit operational to generate a switching signal to the first lower switch in response to the first input signal, wherein a supply current associated with the first inverter circuit is processed by the first current pulse generator to provide a high current pulse to the first upper switch to accelerate a write current transition associated with the first upper switch.

Another embodiment of the invention is directed to a write current driver circuit comprising an H-switch driver having first and second upper switches and further having first and second lower switches, wherein the H-switch driver is operational to direct write current in opposite directions through a write head connected between a first node connecting the first upper switch to the first lower switch and a second node connecting the second upper switch to the second lower switch in response to first and second input signals; means for generating a first current pulse; and means for generating a switching signal to the first lower switch in response to the first input signal, wherein a supply current associated with the means for generating a switching signal to the first lower switch is processed by the means for generating a first current pulse to provide a high current pulse to the first upper switch to accelerate a write current transition associated with the first upper switch.

Still another embodiment of the invention is directed to a method of accelerating write current transitions associated with the upper switches of a magnetic recording head H-switch driver comprising the steps of providing a write current driver having an H-switch, first and second current pulse generators, and first and second inverters; generating a switching signal via the first inverter to a first lower switch associated with the H-switch in response to a first input signal; and processing a supply current associated with the first inverter via the first current pulse generator to provide a high current pulse to a first upper switch associated with the H-switch to accelerate a write current transition associated with the first upper switch.

BRIEF DESCRIPTION OF THE DRAWINGS

Other aspects, features and advantages of the present invention will be readily appreciated, as the invention becomes better understood by reference to the following detailed description when considered in connection with the accompanying drawing figure wherein.

While the above-identified drawing figure sets forth particular embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION OF THE PREFERRED EMBODIMENTS

As stated herein before, H-switch drivers are used in magnetic disk drives to supply write current to the inductive recording head to write data to recording disks. An H-switch generally includes four transistor switches, each forming one leg of the H-switch. A write head coil is then connected to terminals across the center span of the H-switch. Current is passed through the coil in a first direction by operating two of the transistor switches in opposite legs of the H-switch. Similarly, current is passed through the coil in the opposite direction by operating the remaining two transistor switches.

Figure 1A:
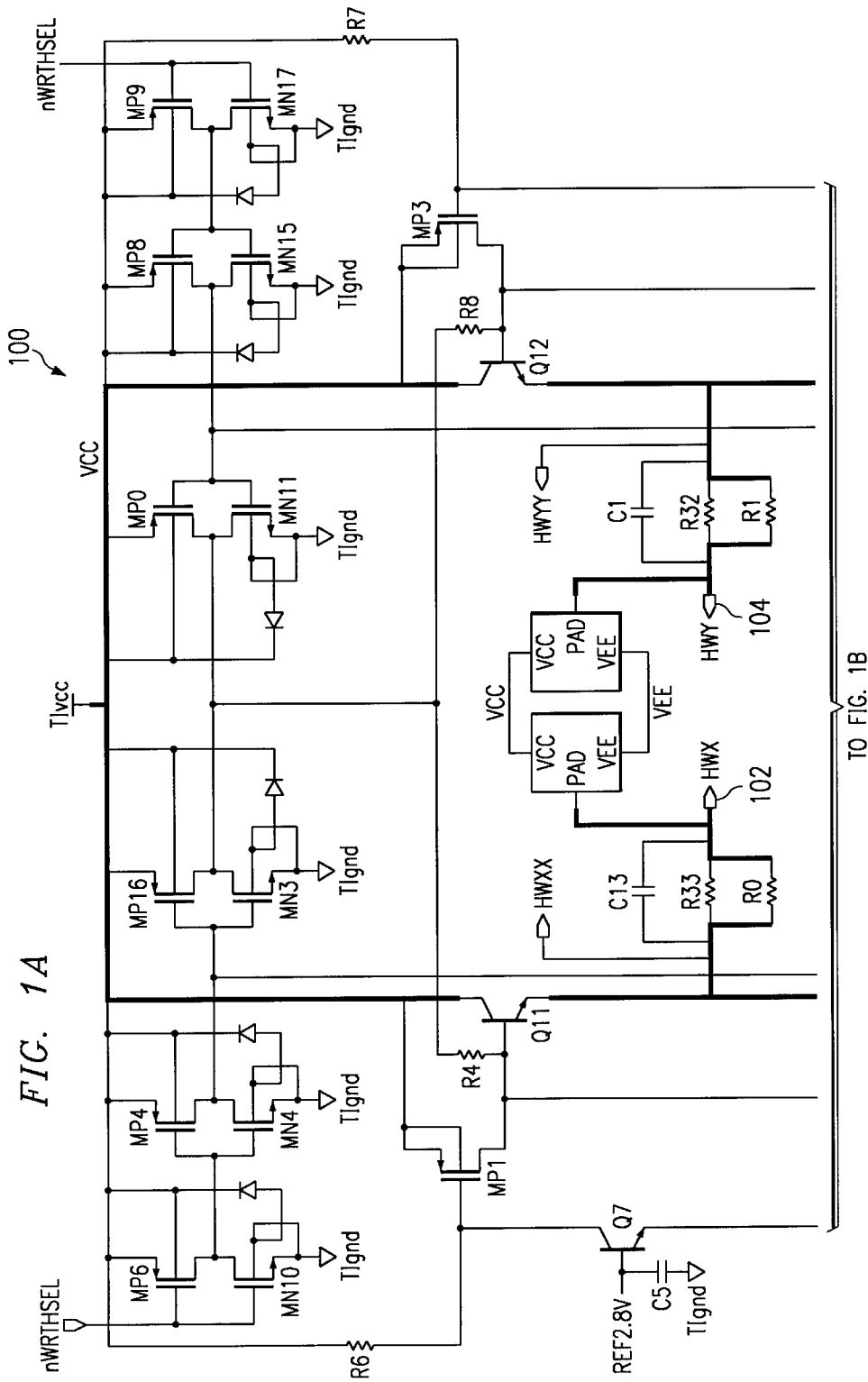
FIG. 1 is a schematic diagram illustrating a write driver circuit for an inductive recording head according to one embodiment of the present invention.
Figure 1B:
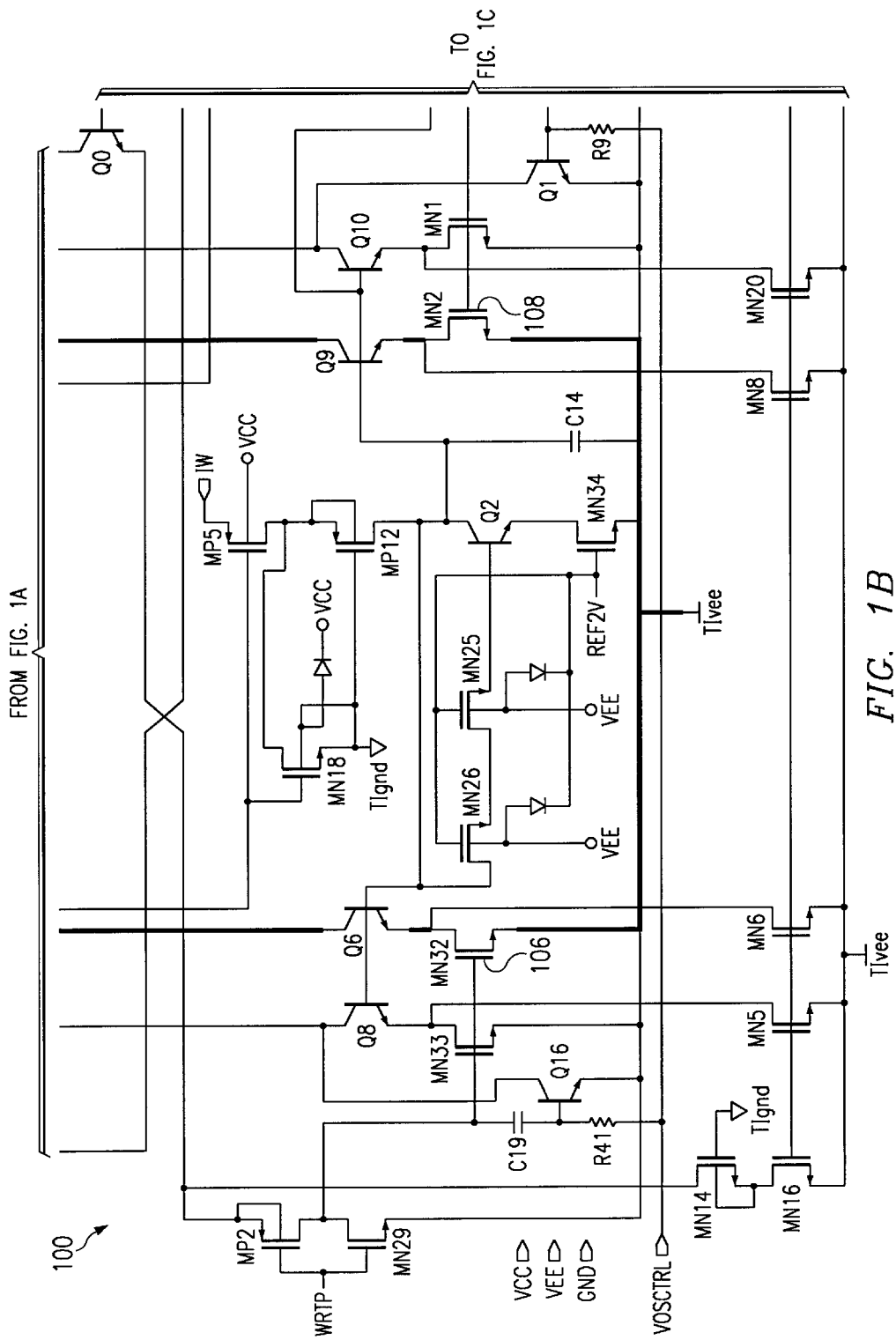
Figure 1C:
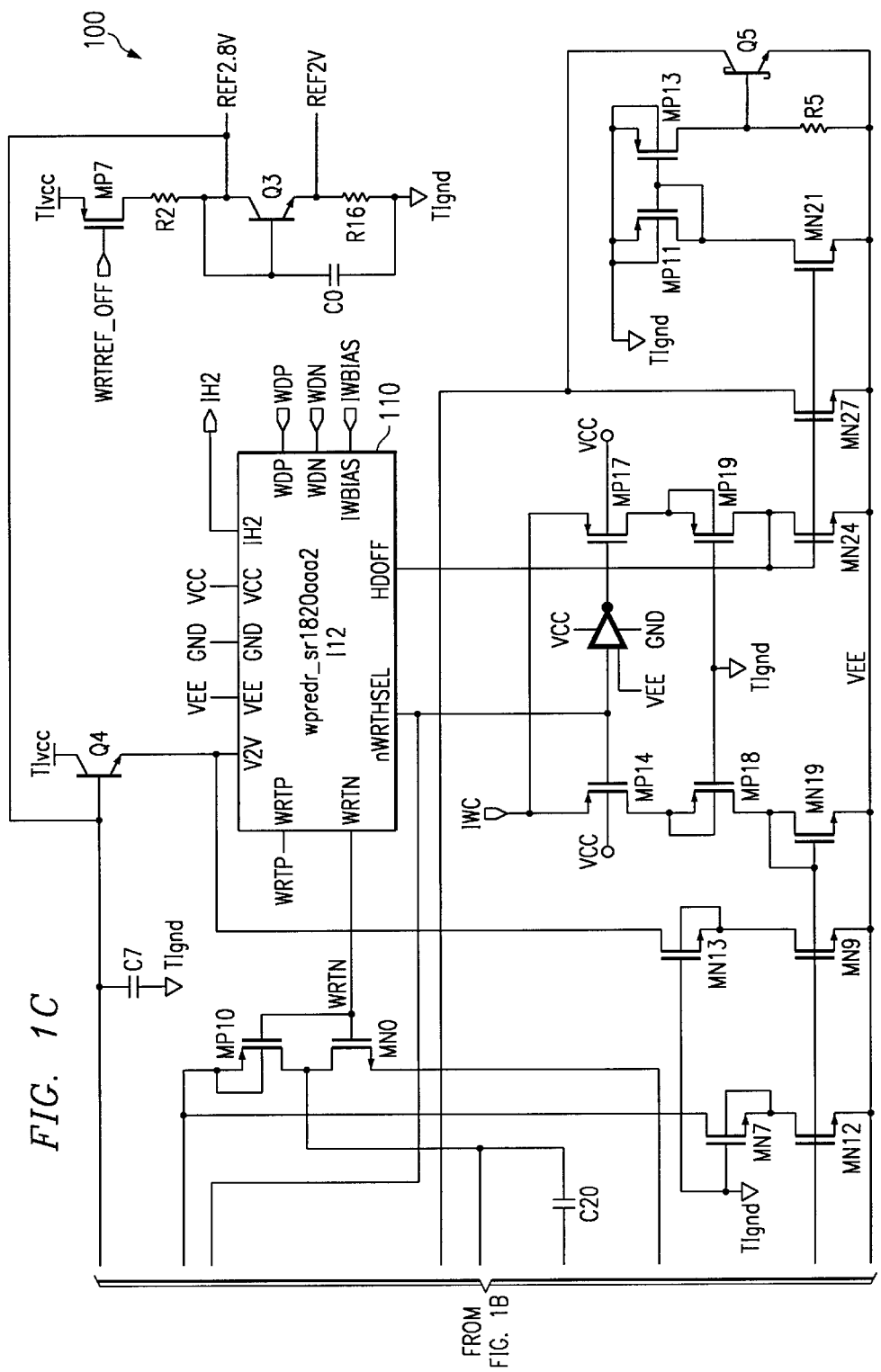

Looking now at FIG. 1, a schematic diagram illustrates a write driver circuit 100 for an inductive recording head according to one embodiment of the present invention. Write driver circuit 100 can be seen to include an H-switch driver comprising upper H-switch NPN transistors Q11 and Q12 as well as lower H-switch NPN transistors Q6 and Q9.

Write current flows through the inductive write head at pins HWX 102 and HWY 104 as opposite H-switch NPN transistors Q11 and Q9 turn on, and then switches as the opposite pair of H-switch NPN transistors Q12 and Q6 turn on. The switching transitions must occur very quickly, and the H-switch NPN transistors must be driven very stoutly, as stated herein before. A more detailed discussion regarding operation of H-switches will not be set forth herein in order to enhance clarity in describing the preferred embodiments and to preserve brevity, and since those skilled in the recording head write drive art will already possess such knowledge.

Typically, pull-up resistors R4 and R8 connected to the base of transistor Q11 and Q12 respectively, are fairly low-valued resistors to provide a low-impedance, high-current drive to the bases of H-switch NPN transistors Q11 and Q12 respectively. Those skilled in the art will readily appreciate that this characteristic however, does not contribute to achieving low power dissipation. The '727 patent referenced herein before describes one method to enable increasing the values of resistor R4 and resistor R8 by up to an order of magnitude, and reducing the current applied to them, by providing a current pulse during transition. The method described in the '727 patent however, utilizes the voltage switching of the opposite side of the H-switch, which arrives a little too late to provide an adequately timed pulse.

With continued reference now to FIG. 1, supply currents associated with inverters INV1 and INV2 that are used to drive the NMOS devices 106, 108 in the emitters of transistors Q6 and Q9 respectively, are used to provide an adequately timed current pulse during transition. Inverters INV1 and INV2 are required to buffer the write data signal coming in from the controller in order to achieve sufficient drive for the NMOS devices 106, 108. Typically, a string of four to six inverters is employed wherein each one is progressively stronger, before finally reaching the H-switch. Only the last inverter in the inverter string is in the head cell in the present embodiment. The present inventors recognized that an adequately timed current pulse during transition could be achieved using supply currents associated with inverters INV1 and INV2 since an inverter's supply current is zero, except during a transition. The supply current pulse associated with inverter INV2, for example, passes through emitter follower Q7, biased for proper operation of inverter INV2, and into resistor R6, where a voltage pulse is then generated and applied to the gate of PMOSFET MP1. Transistor MP1 then provides a high current pulse to the base of H-switch NPN transistor Q11 during a write current transition in order to pull up transistor Q11 more quickly than can be achieved simply by using a low current into resistor R4. The supply current pulse from a CMOS inverter such as INV1 or INV2 is of very short duration, only while the input is switching. Thus, the pulse to the PMOS pull-up transistor MP1 is also of very short duration, but adequate to accomplish the desired function. The supply current pulse associated with inverter INV2 precedes the drive to the lower H-switch NPN transistors, and is properly timed to pulse the upper H-switch. In like fashion, the supply current pulse associated with inverter INV1 precedes the drive to the lower H-switch NPN transistors, and is properly timed to provide a high current pulse to the base of upper H-switch NPN transistor Q12. One embodiment of write driver circuit 100 employs a negative supply of −3V; and so +2V must also be supplied to the positive supply connection to provide the requisite logic. The emitter followers (Q7 and Q12) discussed herein above therefore have their respective base nodes tied to +2.8V that is generated internally.

The present invention is not so limited however, and those skilled in the art will readily appreciate that the inverters INV1 and INV2 can be implemented using any known logic function, including, but not limited to, NAND, NOR, and the like so long as the associated supply current pulses are configured to generate the requisite pull-up signals. Further, the power FETs MP1 and MP3 could be replaced with PNP transistors is some implementations of write driver circuit 100.

Although not particularly relevant to the present invention, the logic devices shown across the top of FIG. 1 are used simply for head selection. Resistors R4 and R8 associated with the detailed embodiment of the invention must therefore only connect to the positive supply, and are pulled up to the positive supply when the head is selected; otherwise the inverters at the top of FIG. 1 take resistors R4 and R8 to Ground, thus disabling the H-switch. Those skilled in the art will also appreciate that a preamp can drive several heads (up to 8 in some applications); so there would be eight write driver circuits 100 is such applications, although only one is on at a time during normal operation. Block 110 is the write data pulse shaper that also includes the first few inverters of the associated inverter string. Several 10 $\mu$A current sinks shown across the bottom of write driver circuit 100 simply operate as speed-up devices by keeping their respective transistors from turning off completely. As such, these devices are not germane to the present invention.

In summary explanation, the supply current from an inverter in the inverter string that applies a switching signal to the lower H-switch is used to drive a PMOS device which provides a pull-up pulse to the upper H-switch. At the time of a write current transition, circuitry in the write driver must react extremely quickly in order to cause a very fast transition of the current in the inductive load (recording head). Modern practices generally require a write current overshoot of up to 50% or more to achieve adequate performance of a write head; and so there is an extra demand on the head driver circuitry to pull-up the upper H-switch. In contradistinction however, low power consumption must be maintained. The present technique provides a solution to enhancing write driver performance by boosting pull-up current during a write current transition while minimizing power consumption at other times.

In view of the above, it can be seen the present invention presents a significant advancement in the art of inductive recording head write drivers. Further, this invention has been described in considerable detail in order to provide those skilled in the disk drive art with the information needed to apply the novel principles and to construct and use such specialized components as are required. In view of the foregoing descriptions, it should be apparent that the present invention represents a significant departure from the prior art in construction and operation. However, while particular embodiments of the present invention have been described herein in detail, it is to be understood that various alterations, modifications and substitutions can be made therein without departing in any way from the spirit and scope of the present invention, as defined in the claims which follow.

What is claimed is:

1. A write current driver circuit comprising:
   an H-switch driver having first and second upper switches and further having first and second lower switches, wherein the H-switch driver is operational to direct write current in opposite directions through a write head connected between a first node connecting the first upper switch to the first lower switch and a second node connecting the second upper switch to the second lower switch in response to first and second input signals;

a first current pulse generator including a emitter follower circuit; and a first inverter circuit operational to generate a switching signal to the first lower switch in response to the first input signal, wherein a supply current associated with the first inverter circuit providing a high current pulse from the first current pulse generator to the first upper switch to accelerate a write current transition associated with the first upper switch.

2. The write current driver circuit according to claim 1 further comprising:

a second current pulse generator; and a second inverter circuit operational to generate a switching signal to the second lower switch in response to the second input signal, wherein a supply current associated with the second inverter circuit is processed by the second current pulse generator to provide a high current pulse to the second upper switch to accelerate a write current transition associated with the second upper switch.

3. The write current driver according to claim 2 wherein the first and second current pulse generator each comprise:

a power MOSFET device operational to generate a high current pulse in response to the voltage pulse.

4. The write current driver according to claim 1 wherein the first current pulse generator comprises:

a power MOSFET device operational to generate a high current pulse in response to the voltage pulse.

5. A method of accelerating write current transitions associated with the upper switches of a magnetic recording head H-switch driver comprising the steps of:

providing a write current driver having an H-switch, first and second current pulse generators, and first and second inverters;

generating a switching signal via the first inverter to a first lower switch associated with the H-switch in response to a first input signal; and using a supply current associated with the first inverter via the first current pulse generator to provide a high current pulse to a first upper switch associated with the H-switch to accelerate a write current transition associated with the first upper switch wherein said first current pulse generator includes a emitter follower circuit.

6. The method according to claim 5 further comprising the steps of:

generating a switching signal via the second inverter to a second lower switch associated with the H-switch in response to a second input signal; and using a supply current associated with the second inverter via the second current pulse generator to provide a high current pulse to a second upper switch associated with the H-switch to accelerate a write current transition associated with the second upper switch.

* * * * *